(12) United States Patent
Kierat et al.

(10) Patent No.: US 9,145,825 B2
(45) Date of Patent: Sep. 29, 2015

(54) ACTUATING MEANS FOR A VALVE, IN PARTICULAR A WASTEGATE, OF AN EXHAUST GAS TURBOCHARGER

(75) Inventors: Jaroslaw Kierat, Frankenthal (DE); Hermann Burmester, Heidelberg (DE); Christian Winter, Schönau (DE)

(73) Assignee: IHI CHARGING SYSTEMS INTERNATIONAL GMBH, Heidelberg (DE)

( * ) Notice: Subject to any disclaimer, the term of this patent is extended or adjusted under 35 U.S.C. 154(b) by 521 days.

(21) Appl. No.: 13/564,753

(22) Filed: Aug. 2, 2012

(65) Prior Publication Data

US 2012/0292547 A1      Nov. 22, 2012

Related U.S. Application Data

(63) Continuation-in-part of application No. PCT/EP2010/007380, filed on Dec. 4, 2010.

(30) Foreign Application Priority Data

Feb. 11, 2010    (DE) .................. 10 2010 007 600

(51) Int. Cl.
*F16K 3/08*      (2006.01)
*F02B 37/18*    (2006.01)

(52) U.S. Cl.
CPC ............. *F02B 37/183* (2013.01); *F02B 37/18* (2013.01); *F16K 3/08* (2013.01); *Y02T 10/144* (2013.01)

(58) Field of Classification Search
CPC ............. F16K 3/04; F16K 3/06; F16K 3/08; F16K 3/085; F16K 3/214; F16K 3/314; F16K 1/16; F16K 1/20; F16K 1/18; F02B 37/183; F02B 37/18; Y02T 10/144
USPC ............. 251/87, 84, 231, 299, 300, 301, 298, 251/86.333
See application file for complete search history.

(56) References Cited

U.S. PATENT DOCUMENTS

| 236,342 | A | * | 1/1881 | Leng | ................................ 251/86 |
| 291,770 | A | * | 1/1884 | Pratt | ............................ 251/228 |
| 292,353 | A | * | 1/1884 | Pratt | ............................ 251/228 |

(Continued)

FOREIGN PATENT DOCUMENTS

| DE | 10 2006 021 185 | 11/2007 |
| DE | 10 2006 022 | 12/2007 |
| DE | 10 2009 015 899 | 10/2010 |

OTHER PUBLICATIONS

Machine Translation of DE 10 2006 021 185. Obtained Jan. 8, 2015.*

*Primary Examiner* — John K Fristoe, Jr.
*Assistant Examiner* — Andrew J Rost
(74) *Attorney, Agent, or Firm* — Klaus J. Bach (57) ABSTRACT

In an actuating structure for a valve, in particular for a waste gate of an exhaust gas turbocharger, comprising a lever element and a valve closure element which is movably supported by the lever element and has a sealing surface for sealing a valve opening wherein the lever element and the valve element cooperate via respective contact areas, which are curved at least with respect to a plane perpendicular to the axial direction of the valve, the curved contact areas are arranged concentrically with each other and have a common center of curvature which is arranged at least essentially at the level of the sealing surface of the valve closure element.

6 Claims, 6 Drawing Sheets

(56) References Cited

U.S. PATENT DOCUMENTS

| | | | |
|---|---|---|---|
| 298,865 A * | 5/1884 | Leng | 251/86 |
| 1,980,495 A * | 11/1934 | Muir | 251/86 |
| 2,274,776 A * | 3/1942 | Cull | 251/280 |
| 3,972,504 A * | 8/1976 | DiSabatino et al. | 251/82 |
| 4,304,255 A * | 12/1981 | Prince | 137/527.4 |
| 8,820,709 B2 * | 9/2014 | Lombard et al. | 251/301 |
| 2010/0083654 A1 * | 4/2010 | Koch et al. | 60/602 |
| 2011/0000209 A1 * | 1/2011 | Boening et al. | 60/602 |

\* cited by examiner

ACTUATING MEANS FOR A VALVE, IN PARTICULAR A WASTEGATE, OF AN EXHAUST GAS TURBOCHARGER

This is a Continuation In Part application of pending international patent application PCT/EP2010/007380 filed Dec. 4, 2010 and claiming the priority of German patent application 10 2010 007 600.7 filed Feb. 11, 2010.

BACKGROUND OF THE INVENTION

The invention relates to an actuating means for a valve, in particular, a closure member for a waste gate of an exhaust gas turbocharger including a valve closure element with a sealing surface and a curved contact section via which the valve closure element is joined to a lever element.

DE 10 2006 022 482 A1 discloses an exhaust gas control valve for an exhaust gas turbocharger of an internal combustion engine, wherein the exhaust gas valve closure flap comprises a swivel arm and a valve closure head, which is pivotally arranged thereon and which may be brought into abutment against a bypass opening in a turbine housing of the exhaust gas turbocharger for closing the bypass opening, and may be lifted off therefrom for opening the bypass opening. The exhaust gas valve closure head may be swiveled by means of an actuating means, with the arrangement of the valve head at the swivel arm being such that the angle of the valve closure head relative to the bypass opening is adjustable. The contact area between the swivel arm and the valve head is formed by an outer surface and an inner surface of a spherical cap structure.

The known exhaust gas control valve suffers from high wear which increases the risk of failure of the exhaust gas control flap valve.

It is therefore the object of the present invention to provide an actuating means for a valve, that is specifically a valve closure head, in particular for a waste gate of an exhaust gas turbocharger, which has a high functional reliability.

SUMMARY OF THE INVENTION

In an actuating structure for a valve, in particular for a waste gate of an exhaust gas turbocharger, comprising a lever element and a valve closure element which is movably supported by the lever element and has a sealing surface for sealing a valve opening wherein the lever element and the valve element cooperate via respective contact areas, which are curved at least with respect to a plane perpendicular to the axial direction of the valve, the curved contact areas are arranged concentrically with each other and have a common center of curvature which is arranged at least essentially at the level of the sealing surface of the valve closure element.

This arrangement of the curved contact areas between the lever element and valve closure element which are curved away from the sealing surface and are arranged concentrically to each with the center of curvature being disposed in the sealing plane of the valve closure element reduces or even prevents jamming as well as high wear of said contact areas and brings about high functional reliability of the actuating means. This also applies to very high loads, i.e. for example, operation at very high or very low temperatures, as well as ensuring a long life, with a significantly reduced risk of time consuming and expensive repairs.

The inventive actuating means allows a movement and thus an angular adjustment of the valve closure head through swiveling, because the contact areas may contact each other alongside so that the valve seals the through hole very efficiently and may even compensate for manufacturing tolerances, deposits or the like which might negatively influence a tightly sealing seating of the valve closure element on a corresponding valve seat for sealing the through hole. This pivotal movement or angular adjustment, respectively, takes place about the common center of the contact areas between the lever element and the closure element, and any forces which are effective via a valve head of the valve element as well as at the valve element itself, in particular closing forces causes pivotal displacement of the valve closure element. Since in the arrangement according to the invention, the center of curvature is located in the plane of the sealing surface, any swiveling of the valve closure element will cause essentially no sideward movement of the valve closure element so that wear at the contact areas is eliminated or minimized. In addition, jamming of the valve and thus its failure is prevented.

With by the inventive actuating means, the common center of the engagement surface areas of the lever and the valve closure element are such that upon swiveling essentially no radial displacement of the valve closure element occurs since the center of curvature is arranged at least essentially at the level or in the plane of the sealing surface. The inventive actuating means thus provides an articulated joint for the valve closure element, which also compensates for manufacturing tolerances and deposits and therefore provides a very efficient sealing function of the valve. This very efficient sealing function is further improved by the fact that only minimal relative clearances of the individual components can be provided with the inventive actuating means, while simultaneously a compensation of the manufacturing tolerances and the deposits, if any, is possible.

The inventive actuating means further has a high functional reliability which is even increased because the curved contact areas which have a spherical or conical shape increase the resistance against pivoting out of a desired or proper position. Another advantage of the curved contact areas is that with the curved configuration particularly large-surface contact areas can be established, while the required installation space of the actuating means remains small, which again has a wear-reducing effect.

In addition, the inventive actuating means has a very good noise behavior because noise due to relative movements of the elements of the actuating means is almost completely prevented because of the mentioned minimal relative clearances. This has a positive influence on the driving comfort of a motor vehicle with an exhaust gas turbocharger which is equipped with the inventive actuating means, as the actuating means generates no noise which the passengers of the motor vehicle might perceive as discomforting.

The invention will become more readily apparent from the following description of several preferred exemplary embodiments on the basis of the accompanying drawings. The features and feature combinations previously mentioned, or which will be mentioned in the following description are solely illustrative and do not deviate from the scope of the invention.

DESCRIPTION OF PARTICULAR EMBODIMENTS

Figure 1:
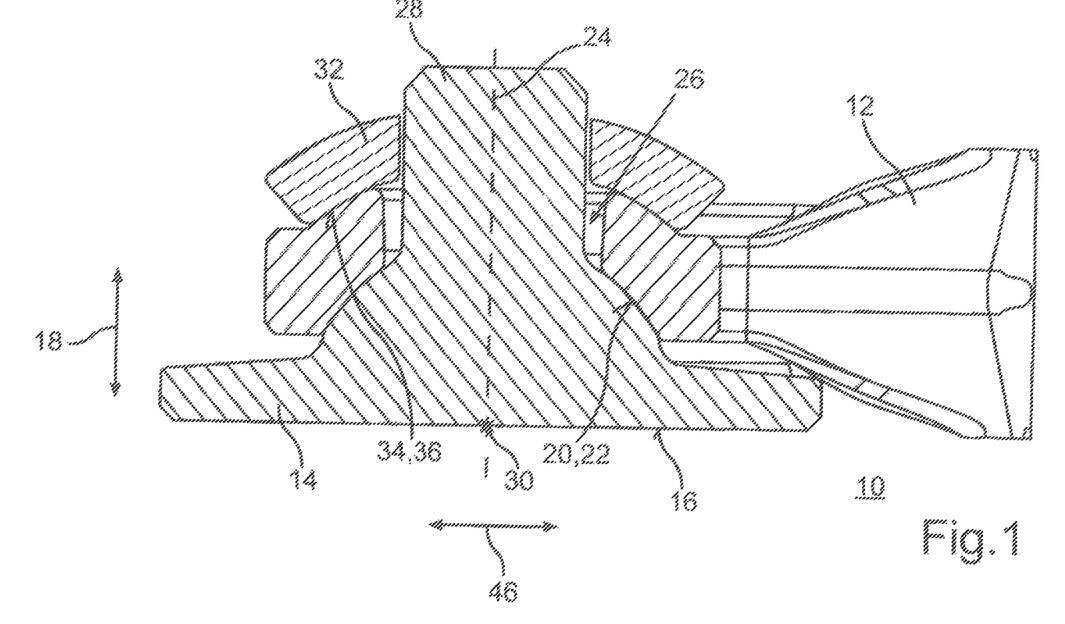
FIG. 1 shows a sectional view of an exemplary embodiment of the inventive actuating means.

FIG. 1 illustrates an actuating means 10 for a wastegate of an exhaust gas turbocharger, by means of which the pressure of an exhaust gas supply to a turbine wheel of a turbine of the exhaust gas turbocharger may be controlled. The actuating means 10 comprises a lever element 12 and a valve closure element 14 whose position may be adjusted via the lever element 12. The valve element 14 comprises a sealing surface 16 which is adapted for sealing a through hole, that is, an opening of a waste gate. A bypass channel may be at least partially closed or at least partially opened, respectively, by means of this valve element 14, with this bypass channel being used to convey a certain amount of exhaust gas of an internal combustion engine which is provided with the exhaust gas turbocharger around the turbine wheel so that the turbine wheel is not subjected to this amount of exhaust gas and is not driven thereby.

The lever element 12 and the valve element 14 which form a valve closure structure cooperate via respective contact areas 20 and 22 which are spherically curved relative to a plane which extends perpendicularly to the axial direction of the valve element 14 which is indicated by a directional arrow 18. The lever and valve elements form some kind of a ball joint by means of which the valve element 14 may perform a swiveling movement for an angular position adjustment for compensating for manufacturing tolerances and/or deposits on a corresponding valve seat. FIG. 1 shows a position of the valve element 14, in which the valve element 14 is in a neutral position and not moved or swiveled, respectively, for an angular adjustment. This means that an axis 24 extends perpendicularly to the sealing surface 16 and parallel to the axial direction of the valve element 14 according to the direction arrow 18 parallel to the axial direction of a through hole 26 of the lever element 12, through which an integrally formed pin 28 of the valve element 14 extends. The contact areas 20 and 22 which are spherically curved away from the sealing surface 16 are arranged concentrically, with a common center o curvature 30 of the contact areas 20 and 22 located at least essentially at the level of the sealing surface 16. The actuating means 10 therefore offers low wear and high functional reliability, because the valve element 14 is self-adjustable and jamming thereof is very unlikely.

As may be seen from FIG. 1, the valve closure element 14 is connected via a connecting element in the form of a disc 32 which is connected by riveting and/or welding to the valve closure element 14 or respectively the pin 28 of the valve closure element 14. The disc 32 provides a counter stop in the axial direction in the direction of the arrow 18 for holding the cooperating contact areas 20 and 22 engaged, so that the actuating means 10 has minimal relative clearances. The disc 32 and the lever element 12 cooperate via the contact areas 34 and 36 which are curved spherically away from the sealing surface 16. In this context, it should be noted that, instead of the curved configuration of the disc 32 as shown in FIG. 1, a roof shape is also possible, which allows a tangential line contact between the disc 32 and the lever element 12.

During assembly of the actuating means 10, the disc 32 is, for example, mounted clearance-free on the pin 28 of the valve closure element 14 and welded together with the pin 28 by of arc welding, pressure welding or laser welding or it is riveted by a riveting process. Any resulting minimal clearance is dependent on the joining method. If necessary, a desired clearance may be obtained by forming a shoulder at the pin 28, with the valve closure element 14 and thus the pin 28 being formed e.g. as a casting, and the shoulder being formed during the casting process.

Figure 2:
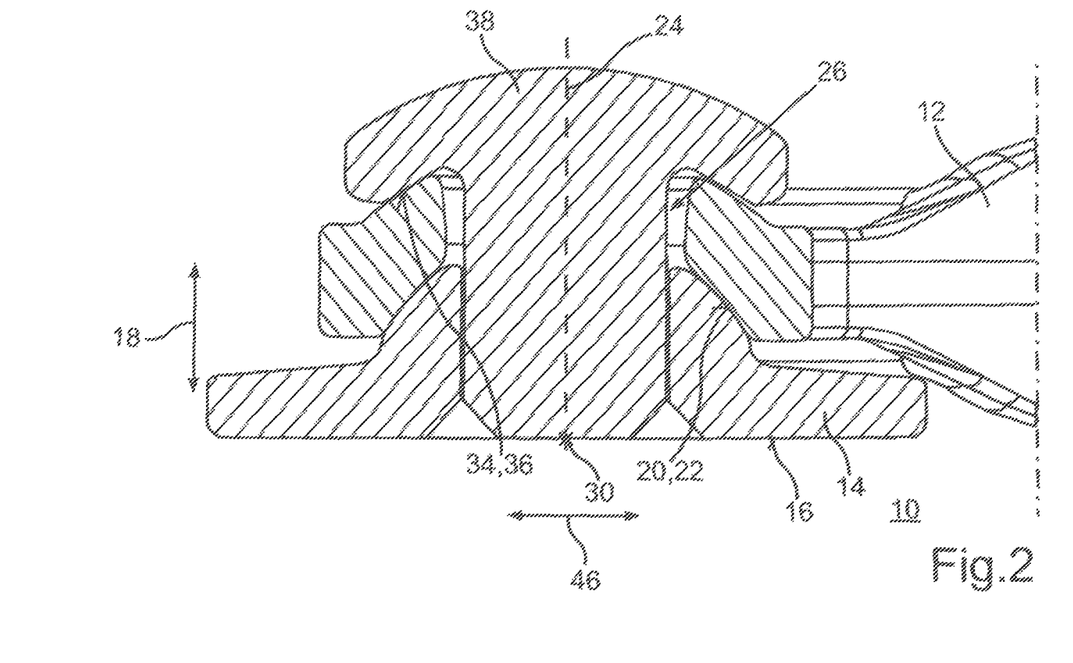
FIG. 2 shows a sectional view of another exemplary embodiment of the inventive actuating means.

FIG. 2 shows an alternative exemplary embodiment of the actuating means 10 where such a retaining shoulder structure is shown.

A connecting element in the form of a connecting pin 38 is connected with the lever element 12, with the connecting pin 38 being formed separately from the valve closure element 14, whereby the connecting pin 38 extends through the hole 26 of the lever element 12 and protrudes into a corresponding accommodation hole of the valve closure element 14. The valve closure element 14 and the connecting pin 38 are e.g. riveted and/or welded together.

In comparison with FIG. 1, it is obvious that, in the arrangement of FIG. 2, the pin 28 is replaced by the connecting pin 38.

Figure 3:
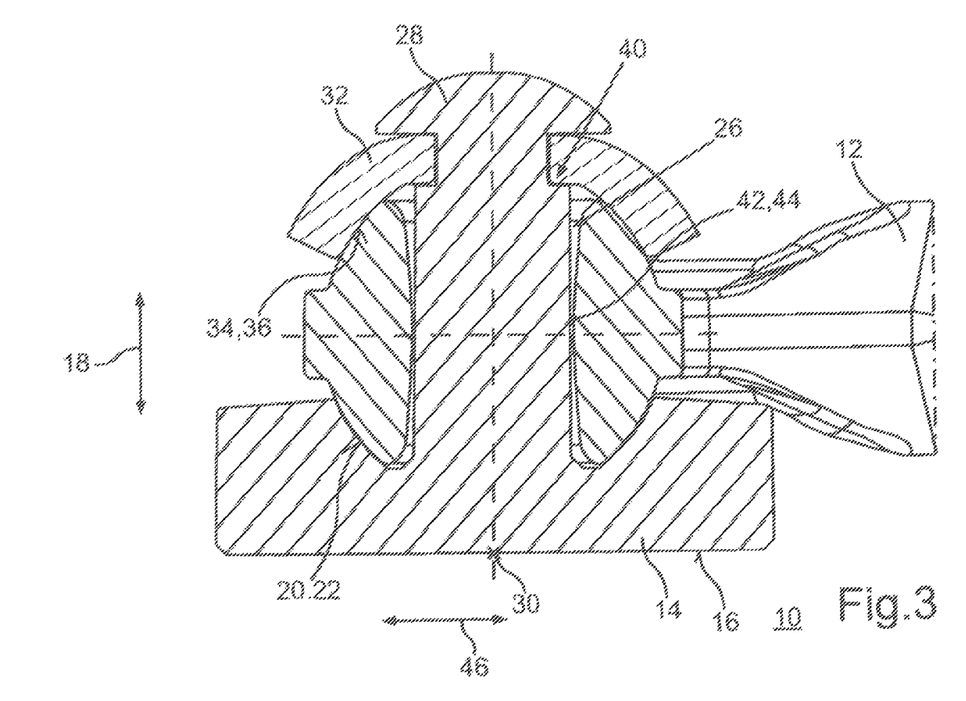
FIG. 3 shows a sectional view of another exemplary embodiment of the inventive actuating means.

FIG. 3 shows another alternative exemplary embodiment of the actuating means 10, which was explained in respect to the actuating means 10 according to FIGS. 1 and 2. The description applies analogously to the actuating means 10 according to FIG. 3. Therein, the valve element 14 comprises the pin 28 in an integral configuration. The pin 28 projects well beyond the through hole 26 of the lever element 12 in an axial direction and also in the radial direction so as to provide an accommodation recess in the form of a groove 40 into which the disc 32 is fitted.

The valve element 14 may again be welded and/or riveted with the disc 32 in order to provide a corresponding counter stop.

In the actuating means 10 according to FIG. 3 the contact areas 20 and 22 are now curved towards the sealing surface 16, while the contact areas 34 and 36 are curved away from the sealing surface 16 and are arranged concentrically to each other, with their common center of curvature 30 being at least essentially located on the Sealing surface 16, for providing low wear, high functional reliability and small clearance in order to prevent clattering noise.

As may further be seen from FIG. 3, the lever element 12 interacts via respective contact areas 42 and 44, with the contact area 44 of the lever element 12 being curved relative to a plane perpendicular to the radial direction according to a direction arrow 46 of the valve element, while the contact area 44 is curved towards the pin 28 and thus towards the valve element 14.

Figure 4:
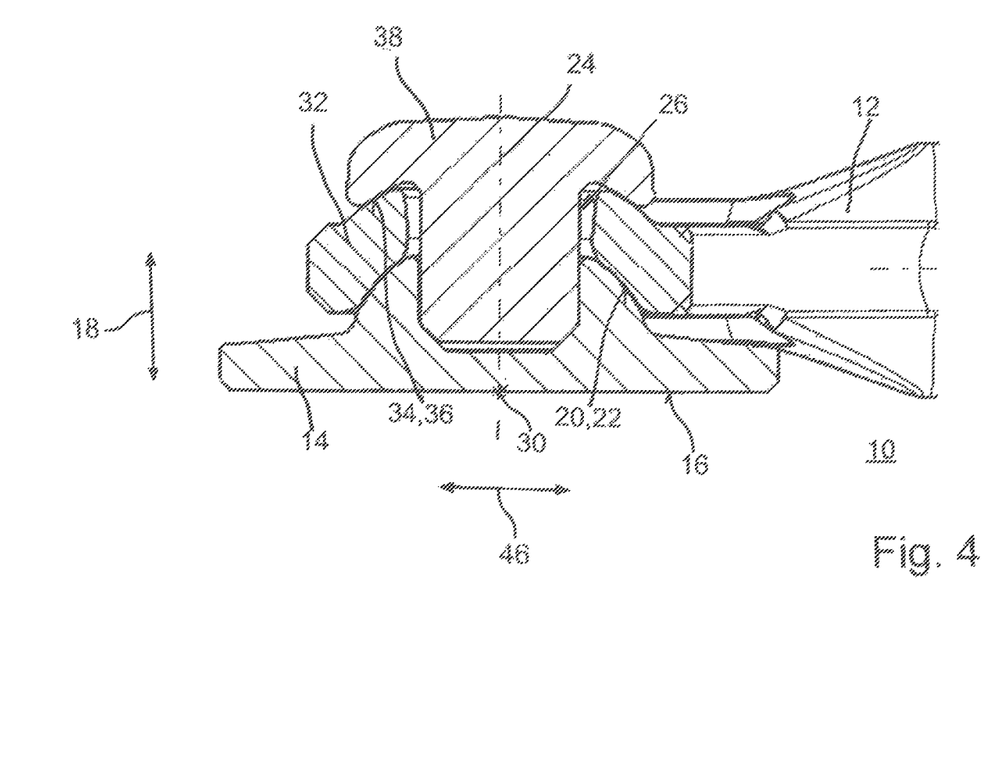
FIG. 4 shows a sectional view of another exemplary embodiment of the inventive actuating means.
Figure 5:
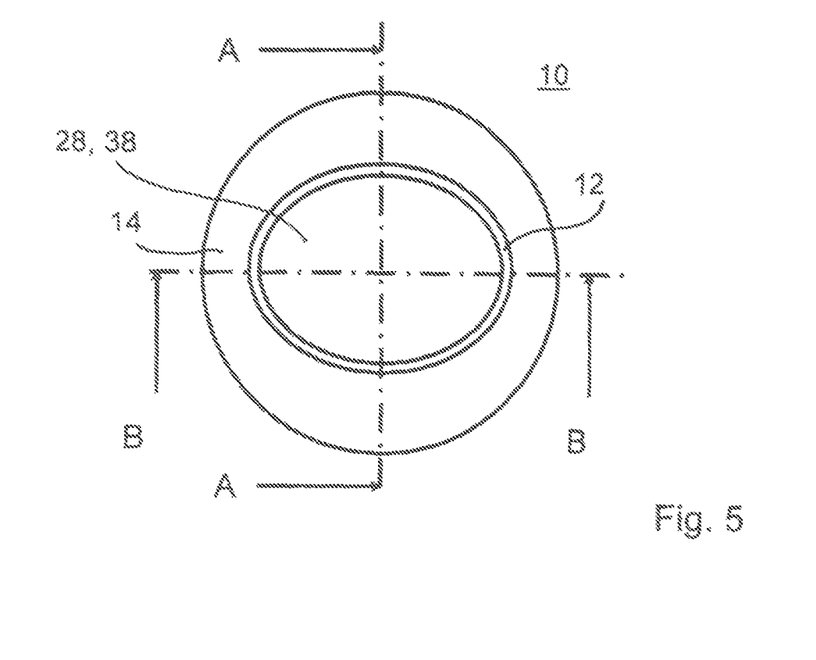
FIG. 5 shows a plan view of another exemplary embodiment of the inventive actuating means.
Figure 6:
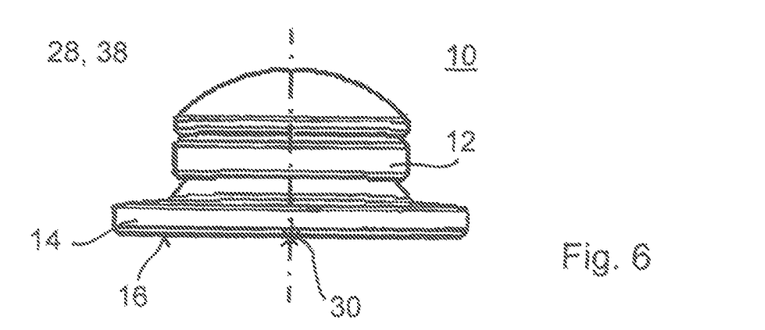
FIG. 6 shows a side view of the exemplary embodiment of the inventive actuating means according to FIG. 5.
Figure 7:
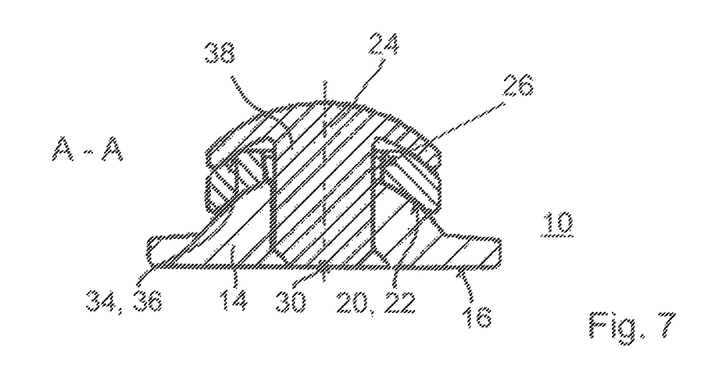
FIG. 7 shows a sectional view of the exemplary embodiment of the inventive actuating means according to FIG. 5 along a line A-A.
Figure 8:
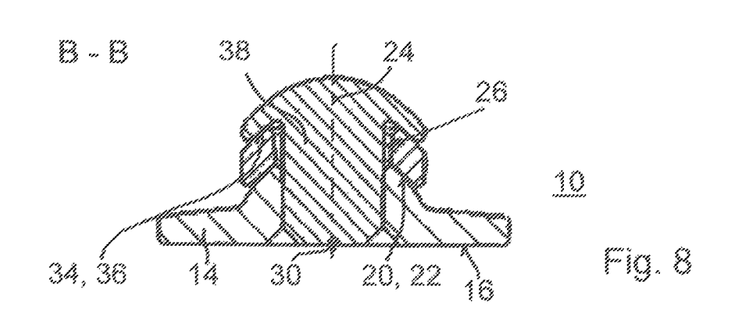
FIG. 8 shows a sectional view of the exemplary embodiment of the inventive actuating means according to FIG. 5 along a line B-B.

FIG. 4 shows another exemplary embodiment of the inventive actuating means 10 which is made by a pressure welding method. In contrast to the exemplary embodiment of FIG. 2, the pin 38 extends only partially into the valve closure element 14. The pin 38 is pressed into the valve closure element 14, and additionally may be welded or soldered.

FIGS. 5, 6, 7 and 8 show views and sectional views of another exemplary embodiment of the inventive actuating means 10. The actuating means 10 comprises a circular valve closure element 14 which is connected by means of a connecting pin 38 with an elliptical cross-section. In this exemplary embodiment, the portion of the connecting pin 38 which completely extends through the valve element 14 has a circular form along its longitudinal axis, while the portion of the connecting pin 38 which connects the lever element 12 with the valve closure element 14 has an elliptical circumference. This embodiment with a shape different from a spherical cap is advantageous in that rotation of the valve closure element about its longitudinal axis can be prevented. Generally, in order to prevent rotation of the valve closure element 14—which may lead to noise and wear due to friction—additional device elements may be provided which, in the case of this embodiment, however may be omitted.

What is claimed is:

1. An actuating arrangement (10) for a valve, in particular for a waste gate of an exhaust gas turbocharger, including a lever element (12), a valve closure element (14) which is pivotally supported by the lever element (12), said valve closure element (14) having a center axis (24) and a sealing surface (16) for sealing a valve opening, with the lever element (12) and the valve element (14) being joined via respective contact areas (20, 22) which are spherically curved with respect to a plane extending perpendicularly to the center axis (24) of the valve closure element (14), so that the curved contact areas (20, 22) are arranged concentrically with respect to each other with a center of curvature (30) for both contact areas (20, 22) which is arranged at least essentially at the intersection of the sealing surface (16) of the valve closure element (14) and the center axis (24) of the closure element (14).

2. The actuating arrangement (10) according to claim 1, wherein the lever element (12) and the valve closure element (14) are connected to each other via at least one connecting element (32, 38).

3. The actuating arrangement (10) according to claim 2, wherein the connecting element (32, 38) is connected to the valve closure element (14) by at least one of riveting and welding.

4. The actuating arrangement (10) according to claim 2, wherein the connecting element is essentially in the form of a curved disc (32).

5. The actuating arrangement (10) according to claim 2, wherein the connecting element comprises a pin (38).

6. The actuating arrangement (10) according to claim 1, wherein the lever element (12) and the valve closure element (14) interact via at least one contact area (20, 22; 34, 36) which is curved with respect to a plane perpendicular to the radial direction (46) of the valve closure element (14).

* * * * *